(12) United States Patent
Fujita et al.

(10) Patent No.: US 9,802,273 B2
(45) Date of Patent: Oct. 31, 2017

(54) METHOD FOR MANUFACTURING ALUMINUM ALLOY CLADDING MATERIAL

(75) Inventors: Kazuko Fujita, Tokyo (JP); Takashi Murase, Tokyo (JP); Akio Niikura, Tokyo (JP)

(73) Assignee: UACJ CORPORATION, Tokyo (JP)

( * ) Notice: Subject to any disclaimer, the term of this patent is extended or adjusted under 35 U.S.C. 154(b) by 179 days.

(21) Appl. No.: 14/356,097

(22) PCT Filed: Nov. 2, 2011

(86) PCT No.: PCT/JP2011/075348
§ 371 (c)(1),
(2), (4) Date: Aug. 26, 2014

(87) PCT Pub. No.: WO2013/065160
PCT Pub. Date: May 10, 2013

(65) Prior Publication Data
US 2014/0367454 A1    Dec. 18, 2014

(51) Int. Cl.
| | |
|---|---|
| *B23K 20/16* | (2006.01) |
| *B32B 15/01* | (2006.01) |
| *B23K 31/02* | (2006.01) |
| *B23K 20/04* | (2006.01) |
| *B23K 20/233* | (2006.01) |

(Continued)

(52) U.S. Cl.
CPC .............. *B23K 31/02* (2013.01); *B23K 20/04* (2013.01); *B23K 20/2336* (2013.01); *B23K 37/00* (2013.01); *B23K 2203/10* (2013.01); *B32B 15/01* (2013.01)

(58) Field of Classification Search
None
See application file for complete search history.

(56) References Cited

U.S. PATENT DOCUMENTS

| | | | | |
|---|---|---|---|---|
| 2,602,413 A | * | 7/1952 | Miller ................. | B23K 35/286 228/245 |
| 3,891,400 A | * | 6/1975 | Robinson ............ | B23K 35/002 428/654 |

(Continued)

FOREIGN PATENT DOCUMENTS

| | | |
|---|---|---|
| CN | 1068774 A | 2/1993 |
| CN | 1266766 A | 9/2000 |

(Continued)

OTHER PUBLICATIONS

Int'l. Search Report, issued in Int'l. App. No. PCT/JP2012/078242, dated Dec. 18, 2012.

(Continued)

*Primary Examiner* — Devang R Patel
(74) *Attorney, Agent, or Firm* — Greer Burns & Crain, Ltd.

(57) ABSTRACT

A first layer (11) and a second layer (12) are layered with an intermediate layer (21) therebetween. A clad material (1) is manufactured by heating and bonding the layered body at a temperature, at which the ratio of the mass of a liquid phase generated from the intermediate layer (21) is 5% or more and 35% or less, and by rolling the body. The clad material may comprise the clad material (1) which is a two-layer material formed of the first layer (11) and the second layer (12) as described above, as well as a third layer, a fourth layer, a fifth layer, and the like.

9 Claims, 3 Drawing Sheets

(51) Int. Cl.
    *B23K 37/00*     (2006.01)
    *B23K 103/10*     (2006.01)

(56) References Cited

U.S. PATENT DOCUMENTS

| | | | | |
|---|---|---|---|---|
| 4,636,356 A | * | 1/1987 | Iwasaki | B23K 35/286 165/905 |
| 4,890,784 A | | 1/1990 | Bampton | |
| 5,190,596 A | * | 3/1993 | Timsit | B23K 35/286 148/23 |
| 5,564,619 A | * | 10/1996 | Childree | B23K 35/0238 228/183 |
| 7,968,211 B2 | | 6/2011 | De Smet et al. | |
| 8,216,693 B2 | * | 7/2012 | Matsukado | B23K 35/0233 428/576 |
| 2004/0185293 A1 | * | 9/2004 | Syslak | B23K 35/0238 428/654 |
| 2005/0079376 A1 | * | 4/2005 | Benedictus | B23K 1/0012 428/654 |

FOREIGN PATENT DOCUMENTS

| | | |
|---|---|---|
| CN | 1546269 A | 11/2004 |
| CN | 1569385 A | 1/2005 |
| CN | 1652925 A | 8/2005 |
| CN | 1686658 A | 10/2005 |
| CN | 101146921 A | 3/2008 |
| CN | 101468535 | 7/2009 |
| CN | 010545062 A | 9/2009 |
| CN | 101927588 A | 12/2010 |
| JP | 59-229294 | 12/1984 |
| JP | 60-191679 | 9/1985 |
| JP | 61-007081 | 1/1986 |
| JP | 03-243228 | 10/1991 |
| JP | 04-036433 | 2/1992 |
| JP | 04-041649 | 2/1992 |
| JP | 06-228690 | 8/1994 |
| JP | 06-235039 | 8/1994 |
| JP | 08-318381 | 12/1996 |
| JP | 2002-361487 | 12/2002 |
| JP | 2003-048077 | 2/2003 |
| JP | 2003-126986 | 5/2003 |
| JP | 2005-523164 | 8/2005 |
| JP | 2006-131923 | 5/2006 |
| JP | 2006-239745 | 9/2006 |
| JP | 2008-111143 | 5/2008 |
| JP | 2008-264825 | 11/2008 |
| JP | 2009-534531 | 9/2009 |
| JP | 2009-226454 | 10/2009 |
| JP | 2009-535508 | 10/2009 |
| JP | 2009-535510 | 10/2009 |
| JP | 2010-094683 | 4/2010 |
| JP | 2010-184284 | 8/2010 |
| JP | 2010-248607 | 11/2010 |
| JP | 2011-042853 | 3/2011 |
| JP | 2011-184795 | 9/2011 |

OTHER PUBLICATIONS

U.S. Appl. No. 14/356,072.
U.S. Appl. No. 14/356,112.
Int'l. Search Report, issued in Int'l. App. No. PCT/JP2011/075348, dated Feb. 7, 2012.
Chinese office action issued in corresponding Chinese Patent App. No. 201280053946.3, dated Jul. 30, 2015 (with translation).
Chinese office action issued in corresponding Chinese Patent App. No. 201280053950.X, dated Aug. 4, 2015 (with translation).
Chinese office action issued in corresponding Chinese Patent App. No. 201180074618.7, dated Sep. 2, 2015 (with translation).
"Welding Handbook, vol. 1 Welding Method and Equipment," The Chinese Mechanical Engineering Society Welding Society, China Machine Press, Jan. 2008, Section 5, p. 876.
Office Action issued by the Chinese Patent Office for corresponding CN Application No. 201180074618.7, dated Jan. 11, 2017 (with English language translation).

* cited by examiner

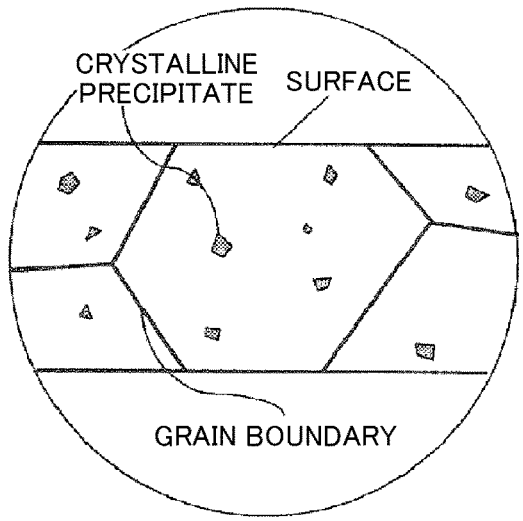
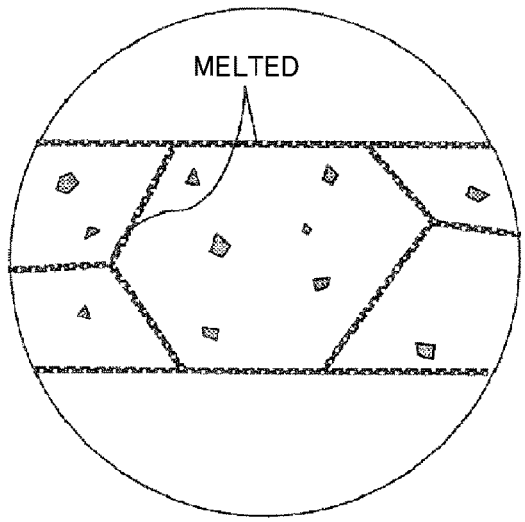
FIG.2A  FIG.2B
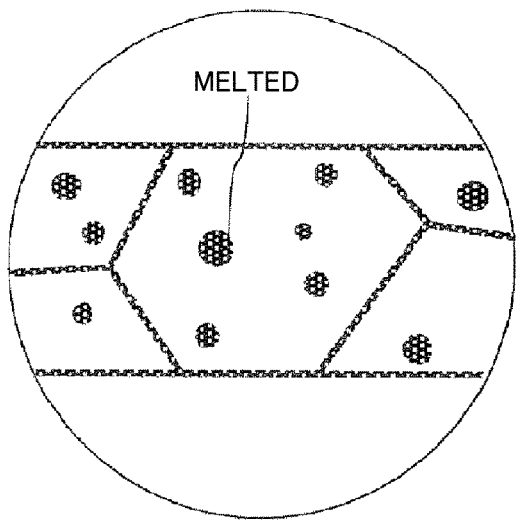
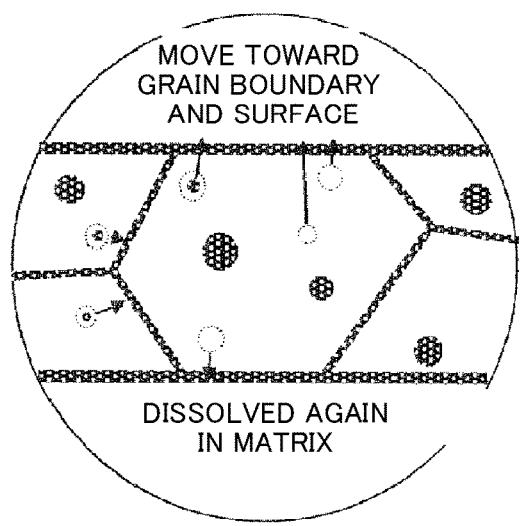
FIG.2C  FIG.2D

METHOD FOR MANUFACTURING ALUMINUM ALLOY CLADDING MATERIAL

This application is being filed under §371 as a National Phase Application of International Application No. PCT/JP2011/075348, filed Nov. 2, 2011.

TECHNICAL FIELD

The present disclosure relates to a method for manufacturing an aluminum alloy cladding material used in the structural members and components of automobiles, ships, aircraft, and the like.

BACKGROUND ART

A method for manufacturing an aluminum alloy cladding material has been conventionally carried out by, for example, hot rolling for joining as described below. First, a core material and a skin material are prepared according to a clad rate of interest. In general, for the core material, an ingot is faced to have a predetermined thickness. For the skin material, an ingot is faced, hot-rolled, rolled to have a predetermined plate thickness, and cut in accordance with the length of the core material alloy. Homogenization treatment of the core material is carried out if necessary, and the skin material and the core material are then joined, heated prior to hot rolling, and is rolled for joining by a reverse-type hot rolling machine. The core material and the skin material are press-fitted by the rolling for joining and rolled to have a thickness of interest after the press-fitting in such a manner that a usual aluminum alloy ingot is hot-rolled.

However, the hot rolling for joining requires rolling under low pressure for suppression of peeling and warpage of a plate until press-fitting strength becomes sufficient and is inferior in productivity to usual rolling. In addition, it is necessary for press-fitting aluminum alloy materials or pure aluminum materials (hereinafter uniformly referred to as aluminum alloy materials) to each other to mechanically demolish an oxide film on a press-fitted interface by deformation and to allow a newly formed surface to appear. Therefore, it is necessary to apply a load, sufficient for demolishing the oxide film on the press-fitted interface, to a portion that is farther from the contact surface of a roll when a clad rate is high, and there are also rolling machine facility limits. Thus, it is considerably difficult to manufacture a material with a high clad rate of more than 20% in the method for manufacturing a clad material by the press-fitting rolling. The degree of difficulty is also high for multilayered materials. For example, there is a method in which press-fitting rolling is divided into two or more processes, which are carried out. However, there are considerable troubles in the method.

Against the problems of the manufacture of a clad material as described above, Patent Literature 1 proposes a manufacturing method in which when a clad material of an aluminum alloy is manufactured, only the surface layers of joining materials are heated, and press-fitting rolling can be carried out at high rolling reduction rate while preventing a clad interface from peeling in rolling for joining. However, in Patent Literature 1, when press-fitting rolling is carried out under unexpected high pressure, since joining surfaces are not bonded to each other, warpage occurs, a press-fitted surface is peeled, and it can be impossible to manufacture a clad material.

A method for obtaining a clad material at a high clad rate is considered to be enabled by a method described in Patent Literature 2. Patent Literature 2 proposes, as a method for bonding metallic materials, a method of heating and pressurizing metal joining materials to be bonded, with an intermediate material, in which an element that is not melted into a parent phase in a solid state is scattered in a soft metal such as aluminum, therebetween, by rolling, extrusion, drawing, and/or the like. In the method, there are manufacture limits that it is necessary to apply strong downward pressurization in a temperature range in which the intermediate material melts. In addition, an element that has a low melting point and does not become a solid solution in a solid state is added to the intermediate material, and it is presumed that only a low-melting-point metal that exists on a surface can be used for bonding. Therefore, there is apprehension that an addition amount for obtaining sufficient bonding strength is considerably increased, a large amount of low-melting-point metal component remains in a bonded interface after bonding, and the characteristics of a metal base material are adversely affected.

There is also a method for manufacturing a clad material by face bonding by solid phase diffusion bonding or liquid phase diffusion bonding. In the solid phase diffusion bonding, long time is needed for bonding compared to welding, brazing, and the like since a diffusion phenomenon is utilized. In general, retention at predetermined temperature is needed for time of around 30 minutes or more. In addition, since pressurization is needed for bonding, complication of a bonding operation and increase in cost are inevitable. Further, in the case of an aluminum alloy material, since a stable, firm oxide film exists on the surface thereof and diffusion is inhibited thereby, it is difficult to apply the solid phase diffusion bonding. When the liquid phase diffusion bonding is used particularly in a large-scale industrial product, it is difficult to optimally control the amount of a remaining insert material to be a liquid phase after bonding the insert material, and it is also difficult to suppress the growth of an intermetallic compound generated in a portion to be bonded. Thus, it is difficult to keep favorable bondability in the liquid phase diffusion bonding.

CITATION LIST

Patent Literature

Patent Literature 1: Unexamined Japanese Patent Application Kokai Publication No. 2008-264825
Patent Literature 2: Unexamined Japanese Patent Application Kokai Publication No. H8-318381

SUMMARY OF INVENTION

Technical Problem

In the case of carrying out hot rolling for joining for manufacturing an aluminum alloy clad material, high manufacture technologies have been required, and further, there have been limits based on the capacities of hot rolling machines and manufacture limits based on clad rates, multilayered materials, and the like. Further, there have been problems that hot rolling for joining has been poor in productivity due to prevention of bonded interfaces from peeling and suppression of warpage of plates. Therefore, a method for manufacturing an aluminum alloy clad material, which is easier, has the high degree of the freedom of the formation of a clad material, and is excellent in productivity, has been desired.

The present disclosure was accomplished with respect to the above-described problems, and an objective thereof is to provide a method for manufacturing an aluminum alloy clad material, capable of easily manufacturing a clad material and forming the multilayered clad material at a high clad rate.

Solution to Problem

In order to achieve the above-described objective, a method for manufacturing an aluminum alloy clad material according to the present disclosure comprises layering plural aluminum alloy materials (including a pure aluminum material) with an intermediate layer therebetween, heating and bonding a layered body at a temperature, at which a ratio of a mass of a liquid phase generated from the intermediate layer is 5% or more and 35% or less, and rolling the body.

A material of the intermediate layer may be an aluminum alloy comprising 0.5 mass % or less (including 0 mass %) of Mg and 0.4-4.5 mass % of Si, and bonding may be carried out in a non-oxidizing atmosphere in a state in which a fluoride-based flux is coated between bonding members.

A material of the intermediate layer may be an aluminum alloy comprising 0.5 mass % or less (including 0 mass %) of Mg and 0.7-10 mass % of Cu, and bonding may be carried out in a non-oxidizing atmosphere in a state in which a fluoride-based flux is coated between bonding members.

A material of the intermediate layer may be an aluminum alloy comprising 0.5 mass % or less (including 0 mass %) of Mg, 0.4-10 mass % of Cu, and 0.3-4.5 mass % of Si, and bonding may be carried out in a non-oxidizing atmosphere in a state in which a fluoride-based flux is coated between bonding members.

A material of the intermediate layer may be an aluminum alloy comprising 0.5 mass % or less (including 0 mass %) of Mg, 0.3-4.5 mass % of Si, 0.5-20 mass % of Zn, and 0.3-10 mass % of Cu, and bonding may be carried out in a non-oxidizing atmosphere in a state in which a fluoride-based flux is coated between bonding members.

A material of the intermediate layer may be an aluminum alloy comprising 0.2-2.0 mass % of Mg and 0.3-5.0 mass % of Si, and bonding may be carried out in atmospheric air, in a non-oxidizing atmosphere, or in a vacuum.

A material of the intermediate layer may be an aluminum alloy comprising 0.2-2.0 mass % of Mg and 0.1-10 mass % of Cu, and bonding may be carried out in atmospheric air, in a non-oxidizing atmosphere, or in a vacuum.

A material of the intermediate layer may be an aluminum alloy comprising 0.2-2.0 mass % of Mg, 0.15-10 mass % of Cu, and 0.1-4.5 mass % of Si, and bonding may be carried out in atmospheric air, in a non-oxidizing atmosphere, or in a vacuum.

A material of the intermediate layer may be an aluminum alloy comprising 0.2-2.0 mass % of Mg, 0.1-4.5 mass % of Si, 0.1-20 mass % of Zn, and 0.1-10 mass % of Cu, and bonding may be carried out in atmospheric air, in a non-oxidizing atmosphere, or in a vacuum.

The aluminum alloy of the intermediate layer may further comprise one or two or more selected from 0.05-1.0 mass % of Si, 0.05-0.5 mass % of Cu, 0.05-1.0 mass % of Fe, 0.05-3.0 mass % of Zn, 0.1-1.8 mass % of Mn, 0.01-0.3 mass % of Ti, and 0.01-0.3 mass % of Zr.

In the above-described method for manufacturing an aluminum alloy clad material, heat treatment in the bonding may be carried out in an atmosphere in which a dew point is 0° C. or less.

Advantageous Effects of Invention

In accordance with the present disclosure, there can be obtained a method for manufacturing an aluminum alloy clad material, capable of easily manufacturing a clad material and forming the multilayered clad material at a high clad rate.

BRIEF DESCRIPTION OF DRAWINGS

FIG. 2A is a schematic view that illustrates a process of generating a liquid phase;

FIG. 2B is a schematic view that illustrates a process of generating a liquid phase, following FIG. 2A;

FIG. 2C is a schematic view that illustrates a process of generating a liquid phase, following FIG. 2B;

FIG. 2D is a schematic view that illustrates a process of generating a liquid phase, following FIG. 2C;

DESCRIPTION OF EMBODIMENTS

The embodiments of the present disclosure will be specifically explained below.

The method for manufacturing an aluminum alloy clad material of the present disclosure comprises layering plural aluminum alloy materials with an intermediate layer therebetween, heating a layered body to a temperature that is lower than the solidus temperature of the aluminum alloy material and at which the ratio of the mass of a liquid phase generated from the intermediate layer (hereinafter referred to as a "liquid phase rate") is 5.0% or more and 35% or less, to thereby overall or partially bond the bond surfaces of the layered layers, and then rolling the body. The bonding results in overall or partial bonding of the bond surfaces of the layered layers and facilitates the subsequent rolling.

When the liquid phase rate is more than 35%, the amount of the generated liquid phase is excessively large, it becomes impossible to maintain the shape of the aluminum alloy material, and the aluminum alloy material is highly deformed. Therefore, the bonding is not uniformly carried out, and the bonding rate is decreased. In contrast, when the liquid phase rate is less than 5.0%, the bonding becomes difficult. It is preferable that the liquid phase rate is 5.0-30%, and it is more preferable that the liquid phase rate is 10-20%.

It is very difficult to measure a real liquid phase rate during heating. Thus, a liquid phase rate stipulated according to the present disclosure is calculated by an equilibrium calculation. Specifically, a liquid phase rate is calculated from alloy composition and the maximum end-point temperature during heating by using thermodynamic equilibrium calculation software such as Thermo-Calc.

In order to reliably carrying out the bonding, a temperature at which the liquid phase rate of the intermediate layer is 5.0% or more is desirably kept for 10 minutes or more. In the present disclosure, the reliability of the bonding is increased with increasing bonding time.

<Behavior of Metal Structure in Bonding>

Figure 1:
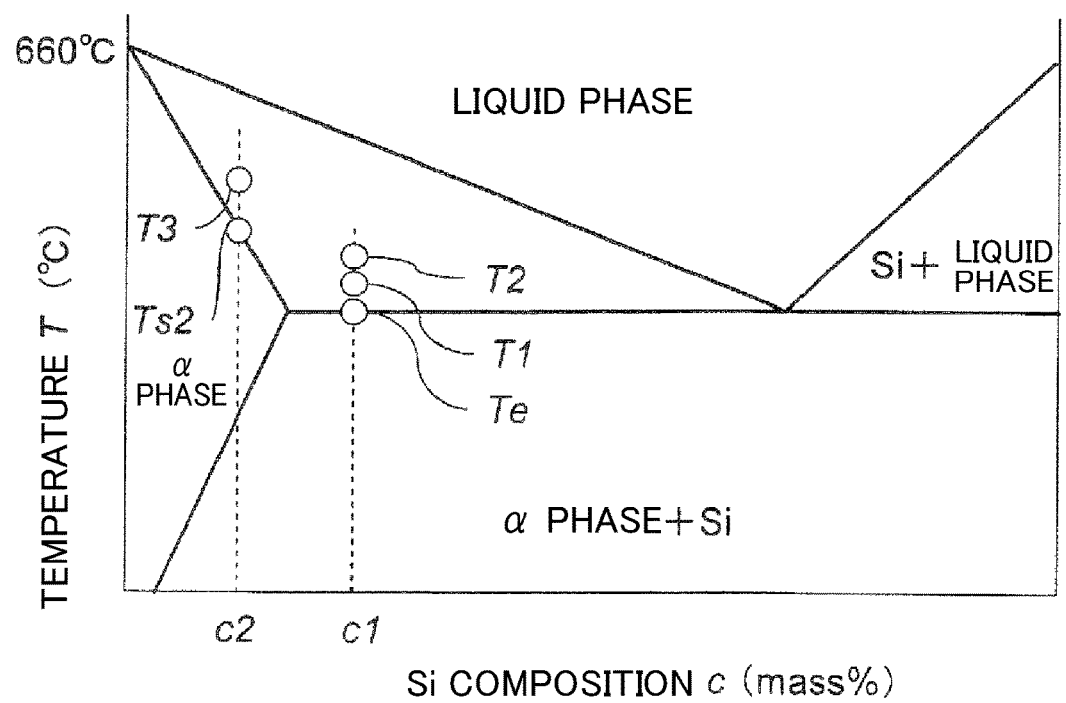
FIG. 1 is a phase diagram that indicates the relationship between the composition of an Al—Si alloy and a temperature.
Figure 3A:
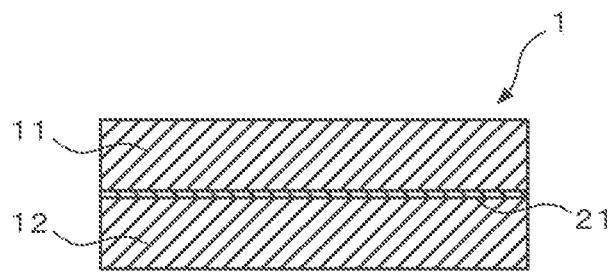
FIG. 3A is a cross-sectional view that illustrates a formation example of a clad material.
Figure 3B:
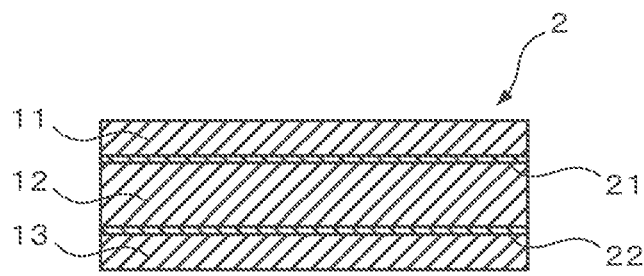
FIG. 3B is a cross-sectional view that illustrates a formation example of a clad material.
Figure 3C:
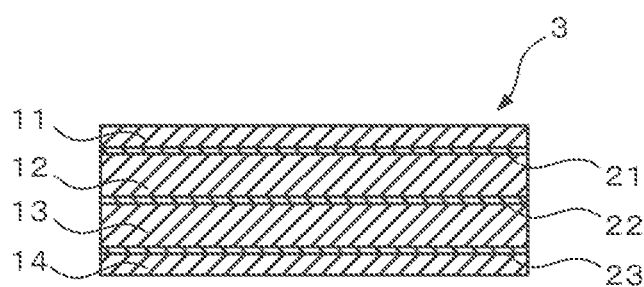
FIG. 3C is a cross-sectional view that illustrates a formation example of a clad material.
Figure 3D:
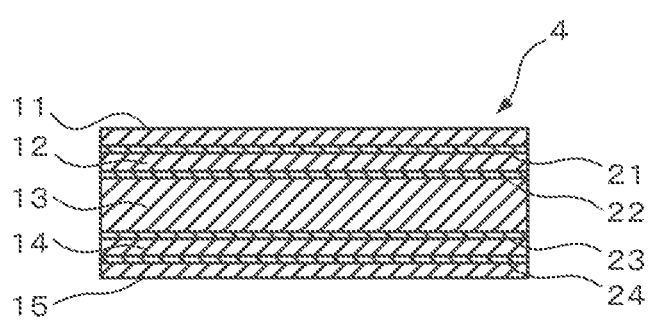
FIG. 3D is a cross-sectional view that illustrates a formation example of a clad material.

A liquid phase generation mechanism will be explained. FIG. 1 schematically illustrates a phase diagram of an Al—Si alloy which is a representative binary eutectic alloy.

When the aluminum alloy material having a Si composition of c1 is heated, generation of a liquid phase begins at a temperature T1 that somewhat exceeds a eutectic temperature (solidus temperature) Te. As illustrated in FIG. 2A, at not more than the eutectic temperature Te, crystalline precipitates are distributed in matrixes sectioned by grain boundaries. When the generation of the liquid phase begins, as illustrated in FIG. 2B, the grain boundaries featuring much segregation in the distribution of crystalline precipitates are melted into liquid phases. Then, as illustrated in FIG. 2C, crystalline precipitate particles of Si, which are main additional elements dispersed in the matrixes of the aluminum alloy material, and the peripheries of intermetallic compounds are melted into spherical liquid phases. Further, as illustrated in FIG. 2D, as a time has elapsed, and as a temperature has been elevated, the spherical liquid phases generated in the matrixes are again dissolved in the matrixes due to grain boundary energies, and are moved toward the grain boundaries and the surface due to diffusion in a solid phase.

Subsequently, as indicated in FIG. 1, when the temperature is elevated to T2, the amount of the liquid phases is increased as being apparent from the phase diagram. As indicated in FIG. 1, when the Si composition of the one aluminum alloy material is c2 which is lower than the maximum solid solubility limit composition, generation of a liquid phase begins at a temperature which somewhat exceeds a solidus temperature Ts2. Provided that, differing from the case of c1, there may be a case where no crystalline precipitate exists in the matrixes just before the structure is melted, as illustrated in FIG. 2A. In the case, as illustrated in FIG. 2B, first, the grain boundaries on which there is a large amount of precipitate or the composition of a solid solution element is high due to intergranular segregation are melted into liquid phases. Thereafter, as illustrated in FIG. 2C, generation of liquid phases begins at locations at which the composition of solute elements is locally high in the matrixes. Similarly to the case of c1, as illustrated in FIG. 2D, as a time has elapsed, and as a temperature has been elevated, the spherical liquid phases generated in the matrixes are again dissolved in the matrixes due to grain boundary energies, and are moved toward the grain boundaries and the surface due to diffusion in a solid phase. When the temperature is elevated to T3, the amount of the liquid phases is increased as being apparent from the phase diagram. As stated above, the method for manufacturing a clad material according to the present disclosure comprises pre-bonding the aluminum alloy materials layered by utilizing the liquid phases that are generated by partial melting in the interior of the aluminum alloy materials.

<Demolition of Oxide Film>

An oxide film is formed on a surface layer of an aluminum alloy material, and is an obstacle to bonding. Accordingly, it is necessary to demolish the oxide film in the bonding. In the method for manufacturing a clad material according to the present disclosure, one of the methods stated in the following "D-1" and "D-2" is adopted for the demolition of the oxide film in the bonding.

D-1. Demolition of Oxide Film with Flux

In the method, a portion to be bonded is at least coated with a flux for the demolition of the oxide film. For the flux, it is possible to use a fluoride-based flux such as KAlF4 or CsAlF4, and a chloride-based flux such as KCl or NaCl, which are used in brazing of an aluminum alloy. Before the liquid phases are melted or before the bonding temperature is attained, each of the fluxes is melted so as to react with the oxide film, resulting in demolition of the oxide film.

Further, in the method, in order to suppress formation of the oxide film, the bonding is carried out in a non-oxidizing atmosphere such as a nitrogen gas or an argon gas. Especially, when the fluoride-based flux is used, it is preferable that the bonding is carried out in the non-oxidizing atmosphere in which an oxygen concentration is 250 ppm or less, and in which a dew point is −25° C. or less.

In addition, when the fluoride-based flux is used, and when the aluminum alloy materials of the one and other members to be bonded contain Mg exceeding 0.50 mass % in the aluminum alloys, the flux and Mg react with each other so that the action of demolishing the oxide film of the flux is diminished. Accordingly, in the present disclosure, the aluminum alloy that generates a liquid phase contains 0.50 mass % or less of Mg.

D-2. Demolition of Oxide Film by Gettering Action of Mg

In a case where a given content of Mg is added to an aluminum alloy material, even when a portion to be bonded is not coated with a flux, the oxide film can be demolished so that it is possible to carry out bonding. In the case, similarly to the case of vacuum fluxless brazing, when the aluminum alloy is melted so that liquid phases appear on the surface thereof, the oxide film is demolished by the gettering action of Mg evaporated from the inside of the aluminum alloy. In the case where the oxide film is demolished by the gettering action of Mg, in order to suppress formation of the oxide film, the bonding is carried out in a vacuum or the above-described non-oxidizing atmosphere. However, since face bonding is carried out in the case of the present disclosure, the bonding can be carried out even in a dried atmosphere. In order that the oxide film is demolished by the gettering action of Mg, in the present disclosure, the aluminum alloy material that generates a liquid phase contains Mg falling within a range from 0.20 mass % to 2.0 mass %. When the Mg content is less than 0.20 mass %, a sufficient gettering action cannot be obtained so that a superior bonding is not attained. On the other hand, when the Mg content exceeds 2.0 mass %, Mg reacts with oxygen in the atmosphere on the surface, and much oxide MgO is generated, resulting in diminution of the bonding.

<Components (Other than Mg) of Aluminum Alloy that Generates Liquid Phase>

Al—Si Alloy:

An Al—Si alloy of which the content of Si is 0.40-4.5 mass % is preferably used. In the case of less than 0.40 mass %, a temperature range in which a liquid phase rate is 5.0% to 35% becomes narrow, so that stable bonding may be difficult. On the other hand, in the case of more than 4.5 mass %, the amount of a liquid phase generated at the solidus temperature=the eutectic temperature is almost 35%, so that a temperature range becomes narrow at a liquid phase rate of 35% from the solidus temperature, and stable bonding may be difficult. It is more preferable that the content of Si is 1.2-3.0 mass %.

Al—Cu Alloy:

An Al—Cu alloy of which the content of Cu is 0.70-10 mass % is preferably used. In the case of less than 0.70 mass %, a temperature range in which a liquid phase rate is 5.0% to 35% becomes narrow, so that stable bonding may be difficult. On the other hand, in the case of more than 10 mass %, strength is increased, so that cracking occurs in rolling, and manufacturing cannot be carried out. It is more preferable that the content of Cu is 1.5-6.0 mass %.

Al—Cu—Si Alloy:

An Al—Cu—Si alloy of which the content of Cu is 0.40-10 mass % and the content of Si is 0.30-4.5 mass % is preferably used. In a case in which the content of Cu is less than 0.40 mass %, a temperature range in which a liquid phase rate is 5.0% to 35% becomes narrow, so that stable bonding may be difficult. On the other hand, in the case of more than 10 mass %, strength is increased, so that cracking occurs in rolling, and manufacturing cannot be carried out. In a case in which the content of Si is less than 0.30 mass %, a temperature range in which a liquid phase rate is 5.0% to 35% becomes narrow, so that stable bonding may be difficult. On the other hand, in the case of more than 4.5 mass %, the amount of a liquid phase generated at the solidus temperature=the eutectic temperature is almost 35%, so that a temperature range becomes narrow at a liquid phase rate of 35% from the solidus temperature, and stable bonding may be difficult. It is more preferable that the content of Cu is 1.5-6.0 mass %, and it is more preferable that the content of Si is 1.2-3.0 mass %.

Al—Si—Zn—Cu Alloy:

An Al—Si—Zn—Cu alloy of which the content of Si is 0.30-4.5 mass %, the content of Zn is 0.50-20 mass %, and the content of Cu is 0.30-10 mass % is preferably used. In a case in which the content of Si is less than 0.30 mass %, a temperature range in which a liquid phase rate is 5.0% to 35% becomes narrow, so that stable bonding may be difficult. On the other hand, in the case of more than 4.5 mass %, the amount of a liquid phase generated at the solidus temperature=the eutectic temperature is almost 35%, so that a temperature range becomes narrow at a liquid phase rate of 35% from the solidus temperature, and stable bonding may be difficult. In a case in which the content of Zn is less than 0.50 mass %, a temperature range in which a liquid phase rate is 5.0% to 35% becomes narrow, so that stable bonding may be difficult. On the other hand, in the case of more than 20 mass %, an aluminum matrix becomes brittle, so that cracking occurs in rolling, and manufacturing cannot be carried out. In a case in which the content of Cu is less than 0.30 mass %, a temperature range in which a liquid phase rate is 5.0% to 35% becomes narrow, so that stable bonding may be difficult. On the other hand, in the case of more than 10 mass %, strength is increased, so that cracking occurs in rolling, and manufacturing cannot be carried out.

Al—Si—Mg Alloy:

An Al—Si—Mg alloy of which the content of Si is 0.30-5.0 mass % is preferably used. In the case of less than 0.40 mass %, a temperature range in which a liquid phase rate is 5.0% to 35% becomes narrow, so that stable bonding may be difficult. On the other hand, in the case of more than 4.5 mass %, the amount of a liquid phase generated at the solidus temperature=the eutectic temperature is almost 35%, so that a temperature range becomes narrow at a liquid phase rate of 35% from the solidus temperature, and stable bonding may be difficult. It is more preferable that the content of Si is 1.2-3.0 mass %.

Al—Cu—Mg Alloy:

An Al—Cu—Mg alloy of which the content of Cu is 0.10-10 mass % is preferably used. In the case of less than 0.70 mass %, a temperature range in which a liquid phase rate is 5.0% to 35% becomes narrow, so that stable bonding may be difficult. On the other hand, in the case of more than 10 mass %, strength is increased, so that cracking occurs in rolling, and manufacturing cannot be carried out. It is more preferable that the content of Cu is 1.5-6.0 mass %.

Al—Cu—Si—Mg Alloy:

An Al—Cu—Si—Mg alloy of which the content of Cu is 0.15-10 mass % and the content of Si is 0.10-4.5 mass % is preferably used. In a case in which the content of Cu is less than 0.15 mass %, a temperature range in which a liquid phase rate is 5.0% to 35% becomes narrow, so that stable bonding may be difficult. On the other hand, in the case of more than 10 mass %, strength is increased, so that cracking occurs in rolling, and manufacturing cannot be carried out. In a case in which the content of Si is less than 0.10 mass %, a temperature range in which a liquid phase rate is 5.0% to 35% becomes narrow, so that stable bonding may be difficult. On the other hand, in the case of more than 4.5 mass %, the amount of a liquid phase generated at the solidus temperature=the eutectic temperature is almost 35%, so that a temperature range becomes narrow at a liquid phase rate of 35% from the solidus temperature, and stable bonding may be difficult.

Al—Si—Zn—Cu—Mg Alloy:

An Al—Si—Zn—Cu—Mg alloy of which the content of Si is 0.10-4.5 mass %, the content of Zn is 0.10-20 mass %, and the content of Cu is 0.10-10 mass % is preferably used. In a case in which the content of Si is less than 0.10 mass %, a temperature range in which a liquid phase rate is 5.0% to 35% becomes narrow, so that stable bonding may be difficult. On the other hand, in a case in which the content of Si is more than 4.5 mass %, the amount of a liquid phase generated at the solidus temperature=the eutectic temperature is almost 35%, so that a temperature range becomes narrow at a liquid phase rate of 35% from the solidus temperature, and stable bonding may be difficult. In a case in which the content of Zn is less than 0.10 mass %, a temperature range in which a liquid phase rate is 5.0% to 35% becomes narrow, so that stable bonding may be difficult. On the other hand, in a case in which the content of Zn is more than 20 mass %, an aluminum matrix becomes brittle, so that cracking occurs in rolling, and manufacturing cannot be carried out. In a case in which the content of Cu is less than 0.10 mass %, a temperature range in which a liquid phase rate is 5.0% to 35% becomes narrow, so that stable bonding may be difficult. On the other hand, in a case in which the content of Cu is more than 10 mass %, strength is increased, so that cracking occurs in rolling, and manufacturing cannot be carried out.

Also, each of the above-described alloys may further contain one or two or more selected from 0.05-1.0 mass % of Si, 0.05-0.50 mass % of Cu, 0.05-1.0 mass % of Fe, 0.05-3.0 mass % of Zn, 0.10-1.8 mass % of Mn, 0.01-0.30 mass % of Ti, and 0.01-0.30 mass % of Zr.

In the method for manufacturing an aluminum alloy clad material of the present disclosure, the difference between the solidus and liquidus temperatures of the aluminum alloy material that generates a liquid phase is preferably 10° C. or more. When a temperature exceeds the solidus temperature, generation of the liquid phase begins. Nevertheless, when the temperature between the solidus temperature and the liquidus temperature is small, a temperature range, in which the solid and the liquid can coexist, becomes narrower, so that it is difficult to control the amount of a liquid phase to be generated.

As the difference between the solidus temperature and the liquidus temperature becomes larger, it is possible to more easily and suitably control the amount of the liquid phase. Accordingly, the upper limit of the difference between the solidus temperature and the liquidus temperature is not especially set. In the aluminum alloy that generates a liquid phase, it is more preferable to set the temperature, at which the liquid phase rate is from 5.0% to 35%, to be 10° C. or more, and it is still more preferable to set the temperature, at which the liquid phase rate is from 5.0 to 35%, to be 20° C. or more.

In the heat treatment for bonding, it is desirable to use a furnace in which a dew point is controlled to 0° C. or less. The concentration of oxygen in the furnace is preferably 5.0% or less.

In the method for manufacturing an aluminum alloy clad material of the present disclosure, rolling is carried out after the bonding at high temperature. The rolling may be any of hot rolling and cold rolling, and the hot rolling is carried out when the plate thickness of the aluminum alloy material is large before the bonding. The rolling is effective in compensating for insufficient bonding by a liquid phase, and the aluminum alloy clad material with higher reliability can be manufactured by the rolling.

For reliably carrying out the bonding, it is desirable to prevent a gap from being formed in the bonded interface as much as possible, for example, by carrying out fixation with an iron band or mounting a weight during the heat treatment. However, when the thickness of an ingot to be bonded is large, the gap on the bonded surfaces is reduced by the self-weight thereof, and therefore pressurization is not always necessary. As a bonding rate (described below) is higher, it is possible to more easily carrying out rolling. However, even when the bonding rate is low, press-fitting is carried out during the rolling, resulting in bonding. The bonding rate is preferably 10-100%, more desirably 20-100%. When the bonding rate is less than 10%, it is more likely to separate each layer during the rolling.

For the material to be bonded, an ingot is faced depending on a clad rate or is previously prepared to have a predetermined thickness by hot rolling. The bonded interface can also be washed with an acid or an alkali in order to enhance the bonding rate.

It is necessary that the solidus temperature (eutectic temperature) of the aluminum alloy material bonded with the aluminum alloy material that generates a liquid phase is higher than the solidus temperature (eutectic temperature) of the aluminum alloy material that generates the liquid phase. In other words, it is necessary to choose the component of the aluminum alloy material that generates the liquid phase depending on an aluminum alloy to be bonded. For example, when the bonding is carried out using a fluoride-based flux in a non-oxidizing atmosphere, it is necessary that the amount of Mg in the aluminum alloy to be bonded is also set to 0.50 mass % or less. When more than 0.50 mass % of Mg is contained, a flux reacts with Mg, resulting in deterioration of the action of demolishing an oxide film of the flux.

In addition, when bonding is carried out utilizing the gettering action of Mg in atmospheric air, a non-oxidizing atmosphere, or a vacuum, it is necessary to set the amount of Mg in an aluminum alloy to be bonded to 2.0 mass % or less. When the Mg amount exceeds 2.0 mass %, Mg reacts with oxygen in the atmosphere on the surface, and much oxide MgO is generated, resulting in diminution of the bonding. However, since the bonding in the case is face bonding, the bonding can be carried out even when the amount of Mg is increased to 6.0 mass % in a case in which the atmosphere in a furnace is a non-oxidizing atmosphere or a vacuum.

As the bonding rate after the heat treatment, it is preferable to carrying out the bonding at 15% or more. When the bonding rate is less than 15%, peeling occurs in rolling, and a clad material cannot be manufactured.

The thickness of a layer that generates a liquid phase is preferably 0.10-10 mm. In the case of less than 0.10 mm, the amount of the generated liquid phase is not sufficient, and bonding becomes insufficient. The thickness of more than 10 mm results in the fear of the excessively large amount of the generated liquid phase, resulting in flowing of the liquid phase in a furnace, and is unfavorable. As illustrated in FIG. 3A to FIG. 3D, for example, a two-layer material, a three-layer material, a four-layer material, and a five-layer material such as the clad materials 1 to 4 can be made. Further, a multilayered material may also be made. In FIG. 3A to FIG. 3D, rolling for joining can be easily and advantageously carried out by inserting layers that generate liquid phases, that is, intermediate layers 21 to 24 between first layers 11 to 15 and previously carrying out bonding.

As explained above, as a result of diligent examination with respect to the above-described problems, the present inventors found a method in which aluminum alloy material layers to be cladded are pre-bonded to each other before hot rolling, the need of hot rolling for joining is eliminated or the hot rolling for joining is simplified, and a multilayered aluminum material at a high clad rate can be manufactured. When the manufacturing method is used, hot rolling for joining can be carried out at high rolling reduction rate, and therefore excellent productivity is exhibited.

In the method for manufacturing an aluminum alloy clad material of the present disclosure, materials to be cladded are overall or partially pre-bonded before hot rolling, resulting in simplification of a manufacturing process that generally requires hot rolling for joining. The bonding is carried out by heat treatment at a temperature at which only the aluminum alloy layer having the lowest solidus temperature is partially melted. In the manufacturing method of the present disclosure, the need of rolling for joining, which generally requires a high manufacturing technology, is eliminated, or a load on hot rolling for joining is greatly reduced. Therefore, limits based on the capacity of a hot rolling machine are reduced. In addition, even in the case of a high clad rate and the case of a multilayered material that is a material based on three or more layers, in which it is generally difficult to make a clad material, the clad material can be relatively easily made. Further, since rolling can be carried out in a state similar to the case of rolling a usual ingot, the stability region of a clad rate is expanded in a width direction and a longitudinal direction, so that yield can be improved. Further, when both of heat treatment in the bonding and homogenization heat treatment of a core material can be carried out, the manufacturing method can be simplified without increasing the number of steps, so that a cost can be reduced.

EXAMPLES

Examples of the disclosure will be described together with comparative examples. The examples below are intended to explain the effect of the disclosure, and the processes and conditions described in the examples are not limited to the technical scope of the disclosure.

Example 1

Two-Layer Material

The components of aluminum alloy materials (hereinafter also referred to as "intermediate layers" in Examples and Tables) functioning as generation of liquid phases used for manufacturing clad materials in bonding are listed in Tables 1 and 2. The components of aluminum alloy materials to be bonded (hereinafter also referred to as "main layers" in Examples and Tables) are listed in Table 3. The solidus temperature of each alloy was listed together in Tables 1-3. The solidus temperature is a value calculated based on the thermodynamic calculation software Thermo-Calc. In addition, "-" in each component in Tables 1-3 means that the element concerned is not contained (less than the detection limit).

Each alloy ingot of the components listed in Tables 1 and 2 was prepared, then faced, and hot-rolled. In addition, each alloy ingot listed in Table 3 was prepared, then subjected to facing processing, and hot-rolled and cold-rolled as needed, to thereby obtain a rolled plate having a predetermined thickness. Two ingots of main layers selected from each alloy material listed in Table 3 were layered to sandwich an alloy material of each intermediate layer listed in Tables 1 and 2 therebetween, gently fixed with an iron band, and then subjected to heat treatment for bonding. The bonded surface of each clad material to be coated with a flux and bonded was coated with a noncorrosive flux based on potassium fluoride or cesium fluoride. The presence or absence and kind of flux coating are listed in Tables 4 and 5. In the tables, "K" represents a potassium fluoride-based noncorrosive flux (KAlF4), "Cs" represents a cesium fluoride-based noncorrosive flux (CsAlF4), and "Absent" represents a case in which a flux was not coated.

TABLE 1

| Alloy No. | Component Value (mass %) | | | | | | | | Solidus Temperature (° C.) | Remarks |
|---|---|---|---|---|---|---|---|---|---|---|
| | Si | Fe | Cu | Mn | Mg | Zn | Ti | Zr | | |
| A1 | 0.40 | 0.20 | 0.02 | — | 0.001 | 0.01 | 0.01 | — | 631 | Within the scope |
| A2 | 1.5 | 0.20 | 0.02 | — | 0.001 | 0.01 | 0.01 | — | 581 | Within the scope |
| A3 | 2.5 | 0.20 | 0.02 | — | 0.001 | 0.01 | 0.01 | — | 575 | Within the scope |
| A4 | 4.5 | 0.20 | 0.02 | — | 0.001 | 0.01 | 0.01 | — | 575 | Within the scope |
| A5 | 2.5 | 0.20 | 0.02 | — | 0.000 | 0.01 | 0.01 | — | 575 | Within the scope |
| A6 | 0.30 | 0.20 | 0.02 | — | 0.001 | 0.01 | 0.01 | — | 636 | Out of the scope |
| A7 | 5.0 | 0.20 | 0.02 | — | 0.001 | 0.01 | 0.01 | — | 575 | Out of the scope |
| A8 | 0.10 | 0.20 | 0.70 | — | 0.001 | 0.01 | 0.01 | — | 632 | Within the scope |
| A9 | 0.10 | 0.20 | 3.0 | — | 0.001 | 0.01 | 0.01 | — | 590 | Within the scope |
| A10 | 0.10 | 0.20 | 6.0 | — | 0.001 | 0.01 | 0.01 | — | 546 | Within the scope |
| A11 | 0.10 | 0.20 | 10 | — | 0.001 | 0.01 | 0.01 | — | 546 | Within the scope |
| A12 | 0.10 | 0.20 | 3.0 | — | 0.000 | 0.01 | 0.01 | — | 590 | Within the scope |
| A13 | 0.10 | 0.20 | 0.50 | — | 0.001 | 0.01 | 0.01 | — | 637 | Out of the scope |
| A14 | 0.10 | 0.20 | 11 | — | 0.001 | 0.01 | 0.01 | — | 546 | Out of the scope |
| A15 | 0.30 | 0.20 | 0.40 | — | 0.001 | 0.01 | 0.01 | — | 628 | Within the scope |
| A16 | 1.0 | 0.20 | 1.0 | — | 0.001 | 0.01 | 0.01 | — | 587 | Within the scope |
| A17 | 3.0 | 0.20 | 3.0 | — | 0.001 | 0.01 | 0.01 | — | 542 | Within the scope |
| A18 | 4.0 | 0.20 | 4.0 | — | 0.001 | 0.01 | 0.01 | — | 535 | Within the scope |
| A19 | 2.0 | 0.20 | 10 | — | 0.001 | 0.01 | 0.01 | — | 525 | Within the scope |
| A20 | 0.40 | 0.20 | 15 | — | 0.001 | 0.01 | 0.01 | — | 540 | Within the scope |
| A21 | 4.5 | 0.20 | 0.50 | — | 0.001 | 0.01 | 0.01 | — | 570 | Within the scope |
| A22 | 0.30 | 0.20 | 10 | — | 0.001 | 0.01 | 0.01 | — | 542 | Within the scope |
| A23 | 4.0 | 0.20 | 4.0 | — | 0.000 | 0.01 | 0.01 | — | 535 | Within the scope |
| A24 | 0.20 | 0.20 | 0.30 | — | 0.001 | 0.01 | 0.01 | — | 636 | Out of the scope |
| A25 | 5.0 | 0.20 | 11 | — | 0.001 | 0.01 | 0.01 | — | 525 | Out of the scope |
| A26 | 0.30 | 0.20 | 0.30 | — | 0.001 | 0.50 | 0.01 | — | 628 | Within the scope |
| A27 | 0.30 | 0.20 | 0.40 | — | 0.001 | 10 | 0.01 | — | 594 | Within the scope |
| A28 | 0.40 | 0.20 | 0.50 | — | 0.001 | 20 | 0.01 | — | 555 | Within the scope |
| A29 | 1.0 | 0.20 | 1.0 | — | 0.001 | 5.0 | 0.01 | — | 571 | Within the scope |
| A30 | 2.0 | 0.20 | 2.0 | — | 0.001 | 5.0 | 0.01 | — | 543 | Within the scope |

TABLE 1-continued

| Alloy No. | Si | Fe | Cu | Mn | Mg | Zn | Ti | Zr | Solidus Temperature (° C.) | Remarks |
|---|---|---|---|---|---|---|---|---|---|---|
| A31 | 3.0 | 0.20 | 3.0 | — | 0.001 | 5.0 | 0.01 | — | 530 | Within the scope |
| A32 | 4.5 | 0.20 | 2.0 | — | 0.001 | 5.0 | 0.01 | — | 542 | Within the scope |
| A33 | 2.0 | 0.20 | 10 | — | 0.001 | 5.0 | 0.01 | — | 510 | Within the scope |
| A34 | 2.0 | 0.20 | 2.0 | — | 0.000 | 5.0 | 0.01 | — | 543 | Within the scope |
| A35 | 0.20 | 0.20 | 0.20 | — | 0.001 | 0.40 | 0.01 | — | 636 | Out of the scope |
| A36 | 5.0 | 0.20 | 11 | — | 0.001 | 5.0 | 0.01 | — | 500 | Out of the scope |
| A37 | 2.0 | 0.20 | 2.0 | — | 0.001 | 22 | 0.01 | — | 505 | Out of the scope |
| A38 | 2.5 | 0.20 | 0.02 | — | 0.50 | 0.01 | 0.01 | — | 561 | Within the scope |
| A39 | 2.5 | 0.20 | 0.02 | — | 0.60 | 0.01 | 0.01 | — | 561 | Out of the scope |
| A40 | 0.30 | 0.20 | 0.02 | — | 0.70 | 0.01 | 0.01 | — | 622 | Within the scope |
| A41 | 1.5 | 0.20 | 0.02 | — | 0.70 | 0.01 | 0.01 | — | 563 | Within the scope |
| A42 | 2.5 | 0.20 | 0.02 | — | 0.70 | 0.01 | 0.01 | — | 561 | Within the scope |
| A43 | 5.0 | 0.20 | 0.02 | — | 0.70 | 0.01 | 0.01 | — | 561 | Within the scope |
| A44 | 0.20 | 0.20 | 0.02 | — | 0.70 | 0.01 | 0.01 | — | 630 | Out of the scope |
| A45 | 6.0 | 0.20 | 0.02 | — | 0.70 | 0.01 | 0.01 | — | 555 | Out of the scope |
| A46 | 0.10 | 0.20 | 0.10 | — | 0.50 | 0.01 | 0.01 | — | 636 | Within the scope |
| A47 | 0.10 | 0.20 | 3.0 | — | 0.70 | 0.01 | 0.01 | — | 572 | Within the scope |
| A48 | 0.10 | 0.20 | 6.0 | — | 0.70 | 0.01 | 0.01 | — | 526 | Within the scope |
| A49 | 0.10 | 0.20 | 10 | — | 0.70 | 0.01 | 0.01 | — | 524 | Within the scope |

TABLE 2

| Alloy No. | Si | Fe | Cu | Mn | Mg | Zn | Ti | Zr | Solidus Temperature (° C.) | Remarks |
|---|---|---|---|---|---|---|---|---|---|---|
| A50 | 0.10 | 0.20 | 0.05 | — | 0.50 | 0.01 | 0.01 | — | 637 | Out of the scope |
| A51 | 0.10 | 0.20 | 11 | — | 0.70 | 0.01 | 0.01 | — | 523 | Out of the scope |
| A52 | 0.10 | 0.20 | 0.15 | — | 0.70 | 0.01 | 0.01 | — | 634 | Within the scope |
| A53 | 1.0 | 0.20 | 1.0 | — | 0.70 | 0.01 | 0.01 | — | 562 | Within the scope |
| A54 | 3.0 | 0.20 | 3.0 | — | 0.70 | 0.01 | 0.01 | — | 524 | Within the scope |
| A55 | 4.0 | 0.20 | 4.0 | — | 0.70 | 0.01 | 0.01 | — | 516 | Within the scope |
| A56 | 2.0 | 0.20 | 10 | — | 0.70 | 0.01 | 0.01 | — | 510 | Within the scope |
| A57 | 0.40 | 0.20 | 15 | — | 0.70 | 0.01 | 0.01 | — | 511 | Within the scope |
| A58 | 4.5 | 0.20 | 0.50 | — | 0.70 | 0.01 | 0.01 | — | 555 | Within the scope |
| A59 | 0.30 | 0.20 | 15 | — | 0.70 | 0.01 | 0.01 | — | 514 | Within the scope |
| A60 | 0.05 | 0.20 | 0.10 | — | 0.70 | 0.01 | 0.01 | — | 639 | Out of the scope |
| A61 | 5.0 | 0.20 | 11 | — | 0.70 | 0.01 | 0.01 | — | 510 | Out of the scope |
| A62 | 0.10 | 0.20 | 0.10 | — | 0.70 | 0.10 | 0.01 | — | 635 | Within the scope |

TABLE 2-continued

| Alloy No. | Component Value (mass %) | | | | | | | Solidus Temperature (° C.) | Remarks |
|---|---|---|---|---|---|---|---|---|---|
| | Si | Fe | Cu | Mn | Mg | Zn | Ti | Zr | | |
| A63 | 0.30 | 0.20 | 0.40 | — | 0.70 | 10 | 0.01 | — | 576 | Within the scope |
| A64 | 0.40 | 0.20 | 0.50 | — | 0.70 | 20 | 0.01 | — | 513 | Within the scope |
| A65 | 1.0 | 0.20 | 1.0 | — | 0.70 | 5.0 | 0.01 | — | 542 | Within the scope |
| A66 | 2.0 | 0.20 | 2.0 | — | 0.70 | 5.0 | 0.01 | — | 525 | Within the scope |
| A67 | 3.0 | 0.20 | 3.0 | — | 0.70 | 5.0 | 0.01 | — | 512 | Within the scope |
| A68 | 4.5 | 0.20 | 2.0 | — | 0.70 | 5.0 | 0.01 | — | 523 | Within the scope |
| A69 | 2.0 | 0.20 | 10 | — | 0.70 | 5.0 | 0.01 | — | 493 | Within the scope |
| A70 | 0.05 | 0.20 | 0.05 | — | 0.70 | 0.05 | 0.01 | — | 640 | Out of the scope |
| A71 | 0.05 | 0.20 | 0.10 | — | 0.70 | 0.10 | 0.01 | — | 639 | Out of the scope |
| A72 | 5.0 | 0.20 | 11 | — | 0.70 | 3.00 | 0.01 | — | 516 | Out of the scope |
| A73 | 2.0 | 0.20 | 2.0 | — | 0.70 | 22 | 0.01 | — | 482 | Out of the scope |
| A74 | 2.5 | 0.20 | 0.02 | — | 0.20 | 0.01 | 0.01 | — | 569 | Within the scope |
| A75 | 2.5 | 0.20 | 0.02 | — | 2.0 | 0.01 | 0.01 | — | 557 | Within the scope |
| A76 | 2.5 | 0.20 | 0.02 | — | 0.10 | 0.01 | 0.01 | — | 572 | Out of the scope |
| A77 | 2.5 | 0.20 | 0.02 | — | 2.1 | 0.01 | 0.01 | — | 559 | Out of the scope |
| A78 | 0.05 | 0.20 | 3.0 | — | 0.001 | 0.01 | 0.01 | — | 590 | Within the scope |
| A79 | 2.5 | 0.20 | 0.05 | — | 0.001 | 0.01 | 0.01 | — | 575 | Within the scope |
| A80 | 2.5 | 0.05 | 0.02 | — | 0.001 | 0.01 | 0.01 | — | 575 | Within the scope |
| A81 | 2.5 | 1.0 | 0.02 | — | 0.001 | 0.01 | 0.01 | — | 575 | Within the scope |
| A82 | 0.10 | 0.20 | 3.0 | — | 0.001 | 0.05 | 0.01 | — | 589 | Within the scope |
| A83 | 0.10 | 0.20 | 3.0 | — | 0.001 | 3.0 | 0.01 | — | 580 | Within the scope |
| A84 | 1.5 | 0.20 | 0.02 | 0.10 | 0.001 | 0.01 | 0.01 | — | 580 | Within the scope |
| A85 | 1.5 | 0.20 | 0.02 | 1.8 | 0.001 | 0.01 | 0.01 | — | 602 | Within the scope |
| A86 | 2.5 | 0.20 | 0.02 | — | 0.001 | 0.01 | 0.30 | — | 575 | Within the scope |
| A87 | 2.5 | 0.20 | 0.02 | — | 0.001 | 0.01 | 0.01 | 0.01 | 575 | Within the scope |
| A88 | 2.5 | 0.20 | 0.02 | — | 0.001 | 0.01 | 0.01 | 0.30 | 575 | Within the scope |
| A89 | 2.5 | 0.20 | 0.02 | — | 0.50 | 0.01 | 0.01 | — | 561 | Within the scope |
| A90 | 2.5 | 0.20 | 0.02 | — | 0.20 | 0.01 | 0.01 | — | 570 | Within the scope |
| A91 | 2.5 | 0.20 | 0.02 | — | 2.00 | 0.01 | 0.01 | — | 558 | Within the scope |

TABLE 3

| Alloy No. | Component Value (mass %) | | | | | | | Solidus Temperature (° C.) |
|---|---|---|---|---|---|---|---|---|
| | Si | Fe | Cu | Mn | Mg | Zn | Ti | |
| B1 | 0.05 | 0.30 | 0.02 | — | 0.001 | 0.01 | 0.01 | 651 |
| B2 | 0.60 | 0.20 | 4.5 | 0.60 | 0.50 | 0.01 | 0.01 | 526 |
| B3 | 0.20 | 0.20 | 0.10 | 1.0 | — | 0.01 | 0.01 | 643 |
| B4 | 0.20 | 0.20 | 0.10 | 1.0 | 1.0 | 0.01 | 0.01 | 625 |
| B5 | 7.5 | 0.20 | 0.02 | — | 0.001 | 0.01 | 0.01 | 577 |
| B6 | 0.10 | 0.20 | 0.02 | — | 2.5 | 0.01 | 0.01 | 603 |
| B7 | 0.20 | 0.20 | 0.02 | 0.60 | 4.5 | 0.01 | 0.01 | 579 |
| B8 | 0.20 | 0.20 | 0.02 | — | 0.001 | 2.0 | 0.01 | 636 |

The combinations of alloys to be layered, bonding conditions, and results after bonding are listed in Tables 4 and 5. Each size of the ingots was set to 1000 mm in width×2000 mm in length, and the thicknesses thereof were set to respective values listed in Tables 4 and 5. A batch-type furnace was used for bonding, heating was carried out until each heating temperature in bonding listed in Tables 4 and 5 was reached, and retention time was set to 3 hours. Cooling was carried out after bonding heating, cooling was carried out from a bonding heating temperature, and the hot rolling began from each temperature listed in Tables 4 and 5. The rolling was carried out on a condition that a rolling rate in each pass was 5-50%. As the results after the bonding, examination of bonding rates and structure observation after the heat treatment, and results after the rolling are listed. The bonding rate was the average of values measured at three points (center and both ends) in the width direction at the middle position of the length. As a measurement method, a bonded portion was cut out, the cross section thereof was observed with an optical microscope, and a bonding rate was obtained by calculating a bonding percentage with respect to a measurement length. In the structure observation after the bonding, a case in which melting occurred in the aluminum alloy material to be bonded was estimated by symbol "x", and a case in which melting did not occur in the aluminum alloy material to be bonded was estimated by symbol "○". For the results after the rolling, an alloy material in which cracking occurred in rolling in a case in which an alloy material that generates a liquid phase was produced was estimated by symbol "x", and an alloy material that was able to be produced without cracking was estimated by symbol "○". In addition, a clad material that was able to be rolled without peeling a bonded interface in the rolling after the bonding was estimated by symbol "○", and a clad material in which peeling occurred during the rolling was estimated by symbol "x".

TABLE 4

| Case No. | Clad Material First Layer | Clad Material Second Layer | Clad Material Intermediate Layer | Thickness (mm) in Bonding First Layer | Thickness (mm) in Bonding Second Layer | Thickness (mm) in Bonding Intermediate Layer | Solidus Temperature (° C.) First Layer | Solidus Temperature (° C.) Second Layer | Solidus Temperature (° C.) Intermediate Layer | In Bonding Heating Temperature (° C.) | In Bonding Heating Liquid Phase Rate (%) of Intermediate Layer | In Bonding Heating Atmosphere | In Bonding Heating Dew Point (° C.) | In Bonding Heating Coating with Flux | Bonding Results Bonding Rate (%) | Bonding Results Presence or Absence of Melting of First Layer or Second Layer | Rolling Results Cracking of Intermediate Layer in Hot Rolling | Rolling Results Peeling of Layer after Rolling |
|---|---|---|---|---|---|---|---|---|---|---|---|---|---|---|---|---|---|---|
| Example 1 | B1 | B3 | A1 | 100 | 300 | 2 | 651 | 643 | 631 | 638 | 5 | Nitrogen | −50 | K | 15 | ○ | ○ | ○ |
| Example 2 | B1 | B3 | A2 | 100 | 300 | 2 | 651 | 643 | 581 | 620 | 15 | Nitrogen | −50 | K | 60 | ○ | ○ | ○ |
| Example 3 | B1 | B3 | A3 | 100 | 300 | 2 | 651 | 643 | 575 | 610 | 24 | Nitrogen | −50 | K | 61 | ○ | ○ | ○ |
| Example 4 | B1 | B3 | A4 | 100 | 300 | 2 | 651 | 643 | 575 | 580 | 29 | Nitrogen | −50 | K | 51 | ○ | ○ | ○ |
| Example 5 | B1 | B3 | A5 | 100 | 300 | 2 | 651 | 643 | 575 | 610 | 24 | Nitrogen | −50 | K | 61 | ○ | ○ | ○ |
| Example 6 | B1 | B3 | A8 | 100 | 300 | 2 | 651 | 643 | 632 | 639 | 5 | Nitrogen | −50 | K | 22 | ○ | ○ | ○ |
| Example 7 | B1 | B3 | A9 | 100 | 300 | 2 | 651 | 643 | 590 | 620 | 15 | Nitrogen | −50 | K | 56 | ○ | ○ | ○ |
| Example 8 | B1 | B3 | A10 | 100 | 300 | 2 | 651 | 643 | 546 | 570 | 7 | Nitrogen | −50 | K | 25 | ○ | ○ | ○ |
| Example 9 | B3 | B5 | A11 | 300 | 100 | 2 | 643 | 577 | 546 | 550 | 30 | Nitrogen | −50 | Cs | 54 | ○ | ○ | ○ |
| Example 10 | B1 | B3 | A12 | 100 | 300 | 2 | 651 | 643 | 590 | 620 | 15 | Nitrogen | −50 | K | 56 | ○ | ○ | ○ |
| Example 11 | B1 | B3 | A15 | 100 | 300 | 2 | 651 | 643 | 628 | 636 | 5 | Nitrogen | −50 | K | 17 | ○ | ○ | ○ |
| Example 12 | B1 | B3 | A16 | 100 | 300 | 2 | 651 | 643 | 587 | 620 | 14 | Nitrogen | −50 | K | 51 | ○ | ○ | ○ |
| Example 13 | B3 | B8 | A17 | 300 | 100 | 2 | 643 | 636 | 542 | 580 | 27 | Nitrogen | −50 | K | 52 | ○ | ○ | ○ |
| Example 14 | B3 | B5 | A18 | 300 | 100 | 2 | 643 | 577 | 535 | 560 | 30 | Nitrogen | −50 | Cs | 54 | ○ | ○ | ○ |
| Example 15 | B3 | B5 | A19 | 300 | 100 | 2 | 643 | 577 | 525 | 550 | 29 | Nitrogen | −50 | Cs | 52 | ○ | ○ | ○ |
| Example 16 | B1 | B3 | A20 | 100 | 300 | 2 | 651 | 643 | 540 | 550 | 33 | Nitrogen | −50 | Cs | 25 | ○ | ○ | ○ |
| Example 17 | B3 | B8 | A21 | 300 | 100 | 2 | 643 | 636 | 570 | 580 | 30 | Nitrogen | −50 | K | 56 | ○ | ○ | ○ |
| Example 18 | B3 | B5 | A22 | 300 | 100 | 2 | 643 | 577 | 542 | 570 | 24 | Nitrogen | −50 | K | 61 | ○ | ○ | ○ |
| Example 19 | B3 | B5 | A23 | 300 | 100 | 2 | 643 | 577 | 535 | 560 | 30 | Nitrogen | −50 | Cs | 54 | ○ | ○ | ○ |
| Example 20 | B1 | B3 | A26 | 100 | 300 | 2 | 651 | 643 | 628 | 653 | 5 | Nitrogen | −50 | K | 16 | ○ | ○ | ○ |
| Example 21 | B3 | B8 | A27 | 300 | 100 | 2 | 643 | 636 | 594 | 620 | 26 | Nitrogen | −50 | K | 57 | ○ | ○ | ○ |
| Example 22 | B1 | B3 | A28 | 100 | 300 | 2 | 651 | 643 | 555 | 580 | 17 | Nitrogen | −50 | K | 49 | ○ | ○ | ○ |
| Example 23 | B1 | B3 | A29 | 100 | 300 | 2 | 651 | 643 | 571 | 610 | 19 | Nitrogen | −50 | K | 59 | ○ | ○ | ○ |

TABLE 4-continued

| Case No. | Clad Material | | | Thickness (mm) in Bonding | | | Solidus Temperature (°C) | | | In Bonding Heating | | | | Bonding Results | | Rolling Results | |
|---|---|---|---|---|---|---|---|---|---|---|---|---|---|---|---|---|---|
| | First Layer | Second Layer | Intermediate Layer | First Layer | Second Layer | Intermediate Layer | First Layer | Second Layer | Intermediate Layer | Temperature (°C) | Liquid Phase Rate (%) of Intermediate Layer | Atmosphere | Dew Point (°C) | Coating with Flux | Bonding Rate (%) | Presence or Absence of Melting of First Layer or Second Layer | Cracking of Intermediate Layer in Hot Rolling | Peeling of Layer after Rolling |
| Example 24 | B3 | B5 | A30 | 300 | 100 | 2 | 643 | 577 | 543 | 560 | 11 | Nitrogen | −50 | Cs | 44 | ◯ | ◯ | ◯ |
| Example 25 | B3 | B5 | A31 | 300 | 100 | 2 | 643 | 577 | 530 | 550 | 16 | Nitrogen | −50 | Cs | 57 | ◯ | ◯ | ◯ |
| Example 26 | B3 | B8 | A32 | 300 | 100 | 2 | 643 | 636 | 594 | 560 | 30 | Nitrogen | −50 | Cs | 64 | ◯ | ◯ | ◯ |
| Example 27 | B3 | B5 | A33 | 300 | 100 | 2 | 643 | 577 | 510 | 520 | 23 | Nitrogen | −50 | Cs | 62 | ◯ | ◯ | ◯ |
| Example 28 | B3 | B5 | A34 | 300 | 100 | 2 | 643 | 577 | 543 | 560 | 11 | Nitrogen | −50 | Cs | 44 | ◯ | ◯ | ◯ |
| Example 29 | B1 | B3 | A38 | 100 | 300 | 2 | 651 | 643 | 561 | 600 | 21 | Nitrogen | −50 | K | 71 | ◯ | ◯ | ◯ |
| Example 30 | B1 | B3 | A40 | 100 | 300 | 2 | 651 | 643 | 622 | 640 | 14 | Nitrogen | −50 | Absent | 47 | ◯ | ◯ | ◯ |
| Example 31 | B1 | B3 | A41 | 100 | 300 | 2 | 651 | 643 | 563 | 610 | 15 | Nitrogen | −50 | Absent | 45 | ◯ | ◯ | ◯ |
| Example 32 | B1 | B4 | A42 | 50 | 400 | 2 | 651 | 625 | 561 | 600 | 22 | Nitrogen | −50 | Absent | 61 | ◯ | ◯ | ◯ |
| Example 33 | B4 | B6 | A43 | 200 | 200 | 2 | 625 | 603 | 561 | 570 | 31 | Nitrogen | −50 | Absent | 44 | ◯ | ◯ | ◯ |
| Example 34 | B1 | B3 | A46 | 100 | 300 | 2 | 651 | 643 | 636 | 640 | 6 | Nitrogen | −50 | Absent | 23 | ◯ | ◯ | ◯ |
| Example 35 | B1 | B3 | A47 | 100 | 300 | 2 | 651 | 643 | 572 | 620 | 20 | Nitrogen | −50 | Absent | 76 | ◯ | ◯ | ◯ |
| Example 36 | B3 | B8 | A48 | 300 | 100 | 2 | 643 | 636 | 526 | 580 | 15 | Nitrogen | −50 | Absent | 56 | ◯ | ◯ | ◯ |
| Example 37 | B1 | B7 | A49 | 100 | 300 | 2 | 651 | 579 | 524 | 540 | 14 | Nitrogen | −50 | Absent | 51 | ◯ | ◯ | ◯ |
| Example 38 | B1 | B3 | A52 | 100 | 300 | 2 | 651 | 643 | 634 | 640 | 7 | Nitrogen | −50 | Absent | 16 | ◯ | ◯ | ◯ |
| Example 39 | B1 | B3 | A53 | 100 | 300 | 2 | 651 | 643 | 562 | 610 | 14 | Nitrogen | −50 | Absent | 59 | ◯ | ◯ | ◯ |
| Example 40 | B3 | B8 | A54 | 300 | 100 | 2 | 643 | 636 | 524 | 560 | 21 | Nitrogen | −50 | Absent | 57 | ◯ | ◯ | ◯ |
| Example 41 | B5 | B7 | A55 | 100 | 300 | 2 | 577 | 579 | 516 | 550 | 25 | Nitrogen | −50 | Absent | 62 | ◯ | ◯ | ◯ |
| Example 42 | B6 | B7 | A56 | 200 | 200 | 2 | 603 | 579 | 510 | 540 | 28 | Nitrogen | −50 | Absent | 52 | ◯ | ◯ | ◯ |

TABLE 4-continued

| Case No. | Clad Material First Layer | Clad Material Second Layer | Clad Material Intermediate Layer | Thickness (mm) in Bonding First Layer | Thickness (mm) in Bonding Second Layer | Thickness (mm) in Bonding Intermediate Layer | Solidus Temperature (° C.) First Layer | Solidus Temperature (° C.) Second Layer | Solidus Temperature (° C.) Intermediate Layer | In Bonding Heating Temperature (° C.) | In Bonding Heating Liquid Phase Rate (%) of Intermediate Layer | In Bonding Heating Atmosphere | In Bonding Heating Dew Point (° C.) | In Bonding Heating Coating with Flux | Bonding Results Bonding Rate (%) | Bonding Results Presence or Absence of Melting of First Layer or Second Layer | Rolling Results Cracking of Intermediate Layer in Hot Rolling | Rolling Results Peeling of Layer after Rolling |
|---|---|---|---|---|---|---|---|---|---|---|---|---|---|---|---|---|---|---|
| Example 43 | B1 | B5 | A57 | 100 | 300 | 2 | 651 | 577 | 511 | 530 | 15 | Nitrogen | −50 | Absent | 54 | ○ | ○ | ○ |
| Example 44 | B4 | B6 | A58 | 200 | 200 | 2 | 625 | 603 | 555 | 570 | 29 | Nitrogen | −50 | Absent | 57 | ○ | ○ | ○ |
| Example 45 | B6 | B8 | A59 | 100 | 300 | 2 | 577 | 636 | 514 | 540 | 31 | Nitrogen | −50 | Absent | 47 | ○ | ○ | ○ |
| Example 46 | B1 | B3 | A62 | 100 | 300 | 2 | 651 | 643 | 635 | 637 | 5 | Nitrogen | −50 | Absent | 15 | ○ | ○ | ○ |
| Example 47 | B1 | B3 | A63 | 100 | 300 | 2 | 651 | 643 | 576 | 610 | 23 | Nitrogen | −50 | Absent | 68 | ○ | ○ | ○ |
| Example 48 | B5 | B6 | A64 | 100 | 300 | 2 | 577 | 603 | 513 | 570 | 19 | Nitrogen | −50 | Absent | 61 | ○ | ○ | ○ |
| Example 49 | B1 | B3 | A65 | 100 | 300 | 2 | 651 | 643 | 542 | 600 | 19 | Nitrogen | −50 | Absent | 71 | ○ | ○ | ○ |

TABLE 5

| Case No. | Clad Material First Layer | Clad Material Second Layer | Clad Material Intermediate Layer | Thickness (mm) in Bonding First Layer | Thickness (mm) in Bonding Second Layer | Thickness (mm) in Bonding Intermediate Layer | Solidus Temperature (°C) First Layer | Solidus Temperature (°C) Second Layer | Solidus Temperature (°C) Intermediate Layer | In Bonding Heating Temperature (°C) | In Bonding Heating Liquid Phase Rate (%) of Intermediate Layer | In Bonding Heating Atmosphere | In Bonding Heating Dew Point (°C) | Presence or Absense of Flux | Bonding Results Bonding Rate (%) | Bonding Results Presence or Absence of Melting of First Layer or Second Layer | Rolling Results Cracking of Intermediate Layer in Hot Rolling | Rolling Results Peeling of Layer after Rolling |
|---|---|---|---|---|---|---|---|---|---|---|---|---|---|---|---|---|---|---|
| Example 50 | B1 | B8 | A66 | 100 | 300 | 2 | 651 | 636 | 525 | 580 | 25 | Nitrogen | −50 | Absent | 57 | ○ | ○ | ○ |
| Example 51 | B4 | B7 | A67 | 200 | 300 | 2 | 625 | 579 | 512 | 550 | 24 | Nitrogen | −50 | Absent | 56 | ○ | ○ | ○ |
| Example 52 | B3 | B5 | A68 | 300 | 100 | 2 | 643 | 577 | 523 | 540 | 12 | Nitrogen | −50 | Absent | 52 | ○ | ○ | ○ |
| Example 53 | B2 | B2 | A69 | 50 | 400 | 2 | 651 | 526 | 493 | 520 | 27 | Nitrogen | −50 | Absent | 51 | ○ | ○ | ○ |
| Example 54 | B3 | B8 | A74 | 300 | 100 | 2 | 643 | 636 | 569 | 600 | 19 | Nitrogen | −50 | Absent | 61 | ○ | ○ | ○ |
| Example 55 | B1 | B4 | A75 | 100 | 400 | 2 | 651 | 625 | 557 | 580 | 20 | Nitrogen | −50 | Absent | 52 | ○ | ○ | ○ |
| Example 56 | B1 | B3 | A78 | 100 | 300 | 2 | 651 | 643 | 590 | 620 | 14 | Nitrogen | −50 | K | 42 | ○ | ○ | ○ |
| Example 57 | B1 | B3 | A79 | 100 | 300 | 2 | 651 | 643 | 575 | 600 | 18 | Nitrogen | −50 | K | 45 | ○ | ○ | ○ |
| Example 58 | B1 | B3 | A80 | 100 | 300 | 2 | 651 | 643 | 575 | 610 | 23 | Nitrogen | −50 | K | 64 | ○ | ○ | ○ |
| Example 59 | B1 | B3 | A81 | 100 | 300 | 2 | 651 | 643 | 575 | 600 | 14 | Nitrogen | −50 | K | 49 | ○ | ○ | ○ |
| Example 60 | B1 | B3 | A82 | 100 | 300 | 2 | 651 | 643 | 589 | 600 | 5 | Nitrogen | −50 | Absent | 22 | ○ | ○ | ○ |
| Example 61 | B1 | B3 | A83 | 100 | 300 | 2 | 651 | 643 | 580 | 600 | 9 | Nitrogen | −50 | Absent | 40 | ○ | ○ | ○ |
| Example 62 | B1 | B3 | A84 | 100 | 300 | 2 | 651 | 643 | 580 | 610 | 10 | Nitrogen | −50 | Absent | 47 | ○ | ○ | ○ |
| Example 63 | B1 | B3 | A85 | 100 | 300 | 2 | 651 | 643 | 602 | 610 | 10 | Nitrogen | −50 | Absent | 42 | ○ | ○ | ○ |
| Example 64 | B1 | B3 | A86 | 100 | 300 | 2 | 651 | 643 | 575 | 590 | 13 | Nitrogen | −50 | Absent | 54 | ○ | ○ | ○ |
| Example 65 | B1 | B3 | A87 | 100 | 300 | 2 | 651 | 643 | 575 | 590 | 13 | Nitrogen | −50 | Absent | 49 | ○ | ○ | ○ |
| Example 66 | B1 | B3 | A88 | 100 | 300 | 2 | 651 | 643 | 575 | 590 | 13 | Nitrogen | −50 | Absent | 59 | ○ | ○ | ○ |
| Example 67 | B3 | B8 | A89 | 300 | 100 | 2 | 643 | 636 | 561 | 580 | 12 | Nitrogen | −50 | Absent | 52 | ○ | ○ | ○ |
| Example 68 | B1 | B4 | A90 | 100 | 400 | 2 | 651 | 625 | 570 | 590 | 15 | Nitrogen | −50 | Absent | 69 | ○ | ○ | ○ |
| Example 69 | B1 | B3 | A91 | 100 | 300 | 2 | 651 | 643 | 558 | 580 | 20 | Nitrogen | −50 | Absent | 74 | ○ | ○ | ○ |
| Example 70 | B1 | B3 | A4 | 100 | 300 | 2 | 651 | 643 | 575 | 580 | 29 | Nitrogen + Oxygen | −20 | K | 54 | ○ | ○ | ○ |
| Example 71 | B1 | B3 | A10 | 100 | 300 | 2 | 651 | 643 | 546 | 570 | 7 | Nitrogen + Oxygen | 0 | K | 17 | ○ | ○ | ○ |
| Example 72 | B1 | B3 | A41 | 100 | 300 | 2 | 651 | 643 | 563 | 600 | 10 | Atmospheric air | −50 | Absent | 45 | ○ | ○ | ○ |
| Comparative Example 1 | B1 | B1 | A6 | 200 | 200 | 2 | 651 | 561 | 636 | 640 | 3 | Nitrogen | −50 | K | 5 | × | ○ | × |
| Comparative Example 2 | B1 | B3 | A7 | 100 | 300 | 2 | 651 | 643 | 575 | 580 | 33 | Nitrogen | −50 | K | 3 | ○ | ○ | × |
| Comparative Example 3 | B1 | B3 | A13 | 100 | 300 | 2 | 651 | 643 | 637 | 640 | 3 | Nitrogen | −50 | K | 8 | × | ○ | × |
| Comparative Example 4 | — | — | A14 | — | — | — | — | — | 546 | — | — | — | — | — | — | — | × | — |
| Comparative Example 5 | B1 | B3 | A24 | 100 | 300 | 2 | 651 | 643 | 636 | 640 | 3 | Nitrogen | −50 | K | 6 | × | ○ | × |

TABLE 5-continued

| Case No. | Clad Material First Layer | Clad Material Second Layer | Clad Material Intermediate Layer | Thickness (mm) in Bonding First Layer | Thickness (mm) in Bonding Second Layer | Thickness (mm) in Bonding Intermediate Layer | Solidus Temperature (°C) First Layer | Solidus Temperature (°C) Second Layer | Solidus Temperature (°C) Intermediate Layer | In Bonding Heating Temperature (°C) | In Bonding Heating Liquid Phase Rate (%) of Intermediate Layer | In Bonding Heating Atmosphere | In Bonding Heating Dew Point (°C) | In Bonding Heating Presence or Absence of Flux | Bonding Results Bonding Rate (%) | Bonding Results Presence or Absence of Melting of First or Second Layer | Rolling Results Cracking of Intermediate Layer in Hot Rolling | Rolling Results Peeling of Layer after Rolling |
|---|---|---|---|---|---|---|---|---|---|---|---|---|---|---|---|---|---|---|
| Comparative Example 6 | — | — | A25 | — | — | — | — | — | 525 | — | — | — | — | — | — | — | — | — |
| Comparative Example 7 | B1 | B3 | A35 | 300 | 100 | 2 | 643 | 577 | 636 | 640 | 3 | Nitrogen | −50 | K | 3 | x | o | x |
| Comparative Example 8 | — | — | A36 | — | — | — | — | — | 500 | — | — | — | — | — | — | — | — | — |
| Comparative Example 9 | — | — | A37 | — | — | — | — | — | 505 | — | — | — | — | — | — | — | x | — |
| Comparative Example 10 | B1 | B3 | A39 | 300 | 100 | 2 | 643 | 577 | 561 | 580 | 13 | Nitrogen | −50 | K | 8 | o | o | x |
| Comparative Example 11 | B1 | B3 | A44 | 300 | 100 | 2 | 643 | 577 | 630 | 640 | 0 | Nitrogen | −50 | K | 0 | x | o | — |
| Comparative Example 12 | B2 | B4 | A45 | 200 | 200 | 2 | 526 | 625 | 555 | 560 | 3 | Nitrogen | −50 | Absent | 3 | o | o | x |
| Comparative Example 13 | B1 | B3 | A50 | 300 | 100 | 2 | 643 | 577 | 637 | 640 | 4 | Nitrogen | −50 | Absent | 8 | x | o | x |
| Comparative Example 14 | — | — | A51 | — | — | — | — | — | 523 | — | — | — | — | — | — | — | x | x |
| Comparative Example 15 | B1 | B3 | A60 | 300 | 100 | 2 | 643 | 577 | 639 | 640 | 2 | Nitrogen | −50 | Absent | 1 | x | o | x |
| Comparative Example 16 | — | — | A61 | — | — | — | — | — | 510 | — | — | — | — | — | — | — | x | — |
| Comparative Example 17 | B1 | B3 | A70 | 300 | 100 | 2 | 643 | 577 | 640 | 640 | 0 | Nitrogen | −50 | Absent | 0 | x | o | x |
| Comparative Example 18 | B1 | B3 | A71 | 300 | 100 | 2 | 643 | 577 | 639 | 640 | 2 | Nitrogen | −50 | Absent | 5 | x | o | x |
| Comparative Example 19 | — | — | A72 | — | — | — | — | — | 516 | — | — | — | — | — | — | — | x | — |
| Comparative Example 20 | — | — | A73 | — | — | — | — | — | 482 | — | — | — | — | — | — | — | x | — |
| Comparative Example 21 | B1 | B4 | A76 | 100 | 400 | 2 | 651 | 625 | 572 | 600 | 19 | Nitrogen | −50 | Absent | 0 | x | o | x |
| Comparative Example 22 | B3 | B8 | A77 | 300 | 100 | 2 | 643 | 636 | 559 | 590 | 25 | Nitrogen | −50 | Absent | 0 | o | o | x |
| Comparative Example 23 | B1 | B3 | A10 | 100 | 300 | 2 | 651 | 643 | 546 | 560 | 4 | Nitrogen | −50 | Cs | 0 | o | o | x |
| Comparative Example 24 | B1 | B3 | A3 | 100 | 300 | 2 | 651 | 643 | 575 | 630 | 46 | Nitrogen | −50 | K | 14 | o | o | x |

In each of Examples 1-72, the bonding in the heat treatment was sufficiently carried out, and therefore the clad material was able to be produced without peeling in the subsequent rolling.

In each of Comparative Examples 1, 3, 5, 7, 11, 12, 13, 15, 17, 18, and 23, the liquid phase generated from the intermediate layer was less than 5.0% and sufficient, therefore, the bonding was not sufficiently carried out, and the layer was peeled after the rolling, resulting in an insufficient result. In addition, when a temperature was excessively increased for the purpose of generating the liquid phase necessary for the bonding, the first layer or the second layer was melted.

In each of Comparative Examples 2 and 24, the liquid phase generated from the intermediate layer was more than 35%, therefore, the bonding was not sufficiently carried out, and the layer was peeled after the rolling, resulting in an insufficient result.

In Comparative Example 10, the amount of added Mg in the intermediate layer in the case of using the flux was out of the scope of the present disclosure, the oxide film on the surface was not demolished during the bonding, the bonding was not sufficiently carried out, and the layer was peeled after the rolling, resulting in an insufficient result.

In each of Comparative Examples 21 and 22, the amount of added Mg in the intermediate layer in the case of using no flux was out of the scope of the present disclosure, the oxide film on the surface was not demolished during the bonding, bonding was not sufficiently carried out, and the layer was peeled after the rolling, resulting in an insufficient result.

In each of Comparative Examples 4, 6, 8, 9, 14, 16, 19, and 20, cracking occurred during hot-rolling the aluminum alloy material (intermediate layer) that generates the liquid phase, and therefore the clad material was not able to be produced. In Table 5, "-" was indicated in each of the items other than the items of the intermediate layers in themselves in the comparative examples concerned.

Example 2

Materials Based on Three or More Layers

Next, Examples 73-77 of multilayered materials based on three or more layers will be described. In Table 6, bonding conditions and bonding rates are listed. In each of the examples, the aluminum alloy material to be bonded was not melted, each layer was not peeled during the rolling, and the rolling was able to be favorably carried out.

TABLE 6

| Case No. | Aluminum Alloy Material (Main Layer) to be Bonded | | | Aluminum Alloy Material (Intermediate Layer) That Generates Liquid Phase | | | Solidus Temperature (° C.) | | | In Bonding Heating | | | | | | |
|---|---|---|---|---|---|---|---|---|---|---|---|---|---|---|---|---|
| | Alloy | Thickness (mm) in Bonding | | Alloy | Thickness (mm) in Bonding | | Main Layer | Intermediate Layer | Temperature (° C.) | Liquid Phase Rate (%) of Intermediate Layer | | Atmosphere | Dew Point (° C.) | Presence or Absence of Flux | | Bonding Rate (%) |
| Example 73 | B1 First layer | 100 | First layer | A3 | 100 | Between first and second layers | 651 First layer | 575 Between first and second layers | 600 | 18 | Between first and second layers | Nitrogen | −50 | Between first and second layers | Present | 60 |
| | B3 Second layer | 300 | Second layer | A3 | 300 | Between second and third layers | 643 Second layer | 575 Between second and third layers | | 18 | Between second and third layers | | | Between second and third layers | Present | 55 |
| | B1 Third layer | 100 | Third layer | | | | 651 Third layer | | | | | | | | | |
| Example 74 | B1 First layer | 50 | First layer | A50 | 50 | Between first and second layers | 651 First layer | 524 Between first and second layers | 560 | 21 | Between first and second layers | Nitrogen | −50 | Between first and second layers | Absent | 50 |
| | B4 Second layer | 400 | Second layer | A50 | 400 | Between second and third layers | 625 Second layer | 524 Between second and third layers | | 21 | Between second and third layers | | | Between second and third layers | Absent | 60 |
| | B5 Third layer | 50 | Third layer | | | | 577 Third layer | | | | | | | | | |
| Example 75 | B5 First layer | 100 | First layer | A51 | 100 | Between first and second layers | 577 First layer | 516 Between first and second layers | 550 | 25 | Between first and second layers | Nitrogen | −50 | Between first and second layers | Absent | 35 |
| | B3 Second layer | 300 | Second layer | A63 | 300 | Between second and third layers | 643 Second layer | 512 Between second and third layers | | 24 | Between second and third layers | | | Between second and third layers | Absent | 40 |
| | B8 Third layer | 100 | Third layer | | | | 636 Third layer | | | | | | | | | |
| Example 76 | B1 First layer | 50 | First layer | A65 | 50 | Between first and second layers | 651 First layer | 493 Between first and second layers | 550 | 27 | Between first and second layers | Nitrogen | −50 | Between first and second layers | Absent | 55 |
| | B7 Second layer | 100 | Second layer | A65 | 100 | Between second and third layers | 579 Second layer | 493 Between second and third layers | | 27 | Between second and third layers | | | Between second and third layers | Absent | 50 |
| | B2 Third layer | 50 | Third layer | A65 | 50 | Between third and fourth layers | 526 Third layer | 493 Between third and fourth layers | | 27 | Between third and fourth layers | | | Between third and fourth layers | Absent | 50 |

TABLE 6-continued

| Case No. | Aluminum Alloy Material (Main Layer) to be Bonded | | | Aluminum Alloy Material (Intermediate Layer) That Generates Liquid Phase | | | Solidus Temperature (° C.) | | | Temperature (° C.) | In Bonding Heating | | | | |
|---|---|---|---|---|---|---|---|---|---|---|---|---|---|---|---|
| | | Alloy | Thickness (mm) in Bonding | | Alloy | Thickness (mm) in Bonding | Main Layer | | Intermediate Layer | | Liquid Phase Rate (%) of Intermediate Layer | Atmosphere | Dew Point (° C.) | Presence or Absence of Flux | Bonding Rate (%) |
| | Fourth layer | B7 | Fourth layer 100 | | | | Fourth layer 579 | | | | | | | | |
| Example 77 | First layer | B5 | First layer 50 | A64 | Between first and second layers | Between first and second layers | First layer 577 | | Between first and second layers 523 | 550 | Between first and second layers 24 | Nitrogen | −50 | Between first and second layers Absent | Between first and second layers 60 |
| | Second layer | B8 | Second layer 50 | A45 | Between second and third layers | Between second and third layers | Second layer 636 | 2 | Between second and third layers 524 | | Between second and third layers 18 | | | Between second and third layers Absent | Between Second and third layers 50 |
| | Third layer | B6 | Third layer 300 | A45 | Between third and fourth layers | Between third and fourth layers | Third layer 603 | 2 | Between third and fourth layers 524 | | Between third and fourth layers 18 | | | Between third and fourth layers Absent | Between third and fourth layers 55 |
| | Fourth layer | B8 | Fourth layer 50 | A64 | Between fourth and fifth layers | Between fourth and fifth layers | Fourth layer 636 | 1 | Between fourth and fifth layers 523 | | Between fourth and fifth layers 24 | | | Between fourth and fifth layers Absent | Between fourth and fifth layers 65 |
| | Fifth layer | B5 | Fifth layer 50 | | | | Fifth layer 577 | | | | | | | | |

INDUSTRIAL APPLICABILITY

The present disclosure is applicable to an aluminum alloy clad material that is formed by layering aluminum alloy materials with two layers or three or more layers.

REFERENCE SIGNS LIST 1 to 4 Clad materials
11 to 15 First layer to fifth layer
21 to 24 Intermediate layers

The invention claimed is:

1. A method for manufacturing an aluminum alloy clad material, comprising layering plural aluminum alloy materials (including a pure aluminum material) with an intermediate layer therebetween, heating and bonding a layered body at a temperature, at which a ratio of a mass of a liquid phase generated from the intermediate layer is 5% or more and 29% or less, and rolling the body, wherein:
   a material of the intermediate layer is an aluminum alloy comprising 0.5 mass % or less (including 0 mass %) of Mg and 0.4-4.5 mass % of Si, and
   further comprising one or two or more selected from 0.05-0.5 mass % of Cu, 0.1-1.8 mass % of Mn, and 0.01-0.3 mass % of Zr, and
   bonding is carried out in a non-oxidizing atmosphere in a state in which a fluoride-based flux is coated between bonding members.

2. A method for manufacturing an aluminum alloy clad material, comprising layering plural aluminum alloy materials (including a pure aluminum material) with an intermediate layer therebetween, heating and bonding a layered body at a temperature, at which a ratio of a mass of a liquid phase generated from the intermediate layer is 5% or more and 29% or less, and rolling the body, wherein:
   a material of the intermediate layer is an aluminum alloy comprising 0.5 mass % or less (including 0 mass %) of Mg and 0.7-10 mass % of Cu,
   and further comprising one or more selected from 0.1-1.8 mass % of Mn and 0.01-0.3 mass % of Zr, and
   bonding is carried out in a non-oxidizing atmosphere in a state in which a fluoride-based flux is coated between bonding members.

3. A method for manufacturing an aluminum alloy clad material, comprising layering plural aluminum alloy materials (including a pure aluminum material) with an intermediate layer therebetween, heating and bonding a layered body at a temperature, at which a ratio of a mass of a liquid phase generated from the intermediate layer is 5% or more and 29% or less, and rolling the body, wherein:
   a material of the intermediate layer is an aluminum alloy comprising 0.5 mass % or less (including 0 mass %) of Mg, 0.4-10 mass % of Cu, and 0.3-4.5 mass % of Si, and
   further comprising one or more selected from 0.1-1.8 mass % of Mn and 0.01-0.3 mass % of Zr, and
   bonding is carried out in a non-oxidizing atmosphere in a state in which a fluoride-based flux is coated between bonding members.

4. A method for manufacturing an aluminum alloy clad material, comprising layering plural aluminum alloy materials (including a pure aluminum material) with an intermediate layer therebetween, heating and bonding a layered body at a temperature, at which a ratio of a mass of a liquid phase generated from the intermediate layer is 5% or more and 29% or less, and rolling the body, wherein:
   a material of the intermediate layer is an aluminum alloy comprising 0.5 mass % or less (including 0 mass %) of Mg, 0.3-4.5 mass % of Si, 0.5-20 mass % of Zn, and 0.3-10 mass % of Cu, and
   further comprising 0.1-1.8 mass % of Mn, and
   bonding is carried out in a non-oxidizing atmosphere in a state in which a fluoride-based flux is coated between bonding members.

5. A method for manufacturing an aluminum alloy clad material, comprising layering plural aluminum alloy materials (including a pure aluminum material) with an intermediate layer therebetween, heating and bonding a layered body at a temperature, at which a ratio of a mass of a liquid phase generated from the intermediate layer is 5% or more and 29% or less, and rolling the body, wherein:
   a material of the intermediate layer is an aluminum alloy comprising 0.3-5.0 mass % of Si, and
   further comprising one or more selected from 0.1-1.8 mass % of Mn and 0.01-0.3 mass % of Zr, and
   bonding is carried out in atmospheric air, in a non-oxidizing atmosphere, or in a vacuum.

6. A method for manufacturing an aluminum alloy clad material, comprising layering plural aluminum alloy materials (including a pure aluminum material) with an intermediate layer therebetween, heating and bonding a layered body at a temperature, at which a ratio of a mass of a liquid phase generated from the intermediate layer is 5% or more and 29% or less, and rolling the body, wherein:
   a material of the intermediate layer is an aluminum alloy comprising 0.1-10 mass % of Cu, and
   further comprising one or more selected from 0.1-1.8 mass % of Mn and 0.01-0.3 mass % of Zr, and
   bonding is carried out in atmospheric air, in a non-oxidizing atmosphere, or in a vacuum.

7. A method for manufacturing an aluminum alloy clad material, comprising layering plural aluminum alloy materials (including a pure aluminum material) with an intermediate layer therebetween, heating and bonding a layered body at a temperature, at which a ratio of a mass of a liquid phase generated from the intermediate layer is 5% or more and 29% or less, and rolling the body, wherein:
   a material of the intermediate layer is an aluminum alloy comprising 0.15-10 mass % of Cu and 0.1-4.5 mass % of Si, and
   further comprising one or more selected from 0.1-1.8 mass % of Mn and 0.01-0.3 mass % of Zr, and
   bonding is carried out in atmospheric air, in a non-oxidizing atmosphere, or in a vacuum.

8. A method for manufacturing an aluminum alloy clad material, comprising layering plural aluminum alloy materials (including a pure aluminum material) with an intermediate layer therebetween, heating and bonding a layered body at a temperature, at which a ratio of a mass of a liquid phase generated from the intermediate layer is 5% or more and 29% or less, and rolling the body, wherein:
   a material of the intermediate layer is an aluminum alloy comprising 0.1-4.5 mass % of Si, 0.1-20 mass % of Zn, and 0.1-10 mass % of Cu, and
   further comprising one or more selected from 0.1-1.8 mass % of Mn and 0.01-0.3 mass % of Zr, and
   bonding is carried out in atmospheric air, in a non-oxidizing atmosphere, or in a vacuum.

9. The method for manufacturing an aluminum alloy clad material according to claim 1, wherein heat treatment in the bonding is carried out in an atmosphere in which a dew point is 0° C. or less.

* * * * *

UNITED STATES PATENT AND TRADEMARK OFFICE
CERTIFICATE OF CORRECTION

PATENT NO.       : 9,802,273 B2
APPLICATION NO.  : 14/356097
DATED            : October 31, 2017
INVENTOR(S)      : Kazuko Mujita, Takashi Murase and Akio Niikura It is certified that error appears in the above-identified patent and that said Letters Patent is hereby corrected as shown below:

On the Title Page

(56) References Cited:
Under "FOREIGN PATENT DOCUMENTS" delete:
"JP 03-243228 10/91"
And insert:
--JP 03-243288 10/91--

Signed and Sealed this
Tenth Day of April, 2018

Andrei Iancu
*Director of the United States Patent and Trademark Office*